Jan. 2, 1951  S. W. H. W. FALLOON  2,536,496
RADIO SYSTEM, BASED ON ECHO PULSE PRINCIPLE AND
UTILIZING A MODIFIED OMNIDIRECTIONAL RECEIVER,
FOR AIDING AIRCRAFT LANDING
Filed Oct. 23, 1946  2 Sheets-Sheet 1
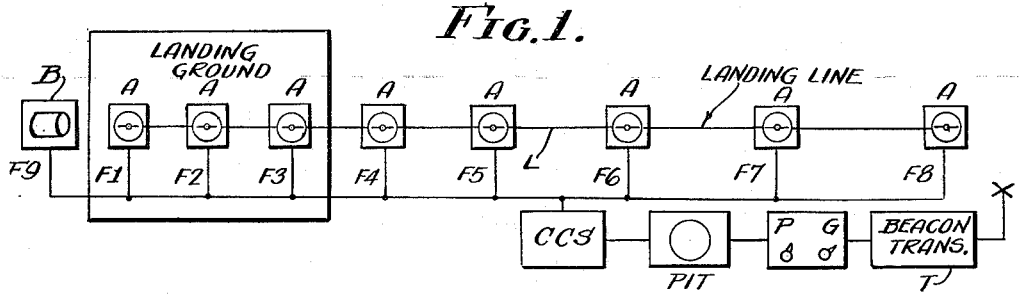
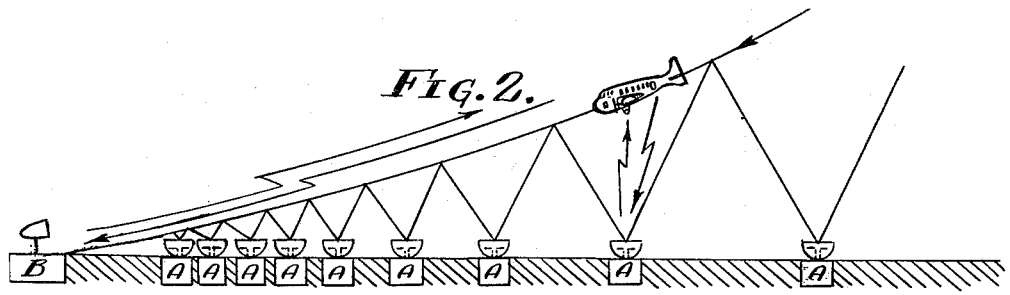
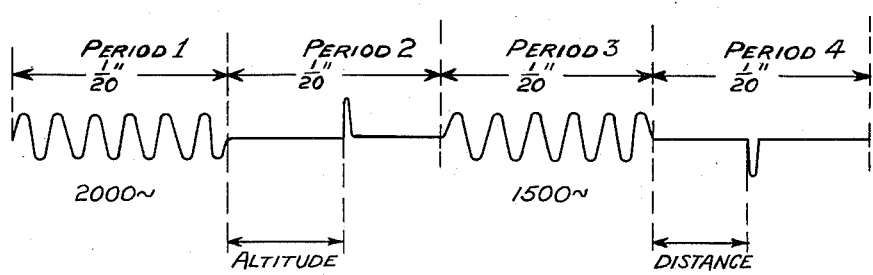
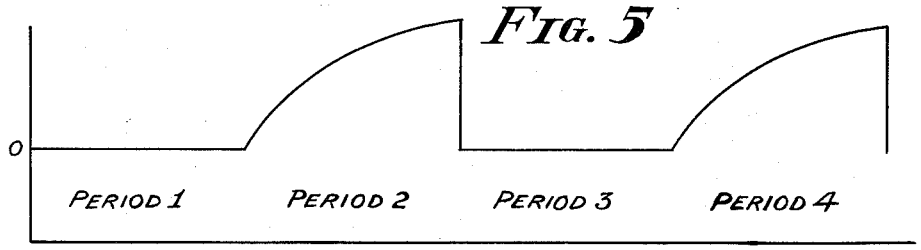
INVENTOR.
Shirley Waldron Hugh Wolseley Falloon
BY
ATTORNEY Jan. 2, 1951 S. W. H. W. FALLOON 2,536,496
RADIO SYSTEM, BASED ON ECHO PULSE PRINCIPLE AND
UTILIZING A MODIFIED OMNIDIRECTIONAL RECEIVER,
FOR AIDING AIRCRAFT LANDING
Filed Oct. 23, 1946 2 Sheets-Sheet 2

INVENTOR.
Shirley Waldron Hugh Wolseley Falloon
BY
ATTORNEY

Patented Jan. 2, 1951

2,536,496

UNITED STATES PATENT OFFICE 2,536,496

RADIO SYSTEM, BASED ON ECHO PULSE PRINCIPLE AND UTILIZING A MODIFIED OMNIDIRECTIONAL RECEIVER, FOR AIDING AIRCRAFT LANDING

Shirley Waldron Hugh Wolseley Falloon, Chelmsford, England, assignor to Radio Corporation of America, a corporation of Delaware Application October 23, 1946, Serial No. 705,214
In Great Britain October 5, 1939

Section 1, Public Law 690, August 8, 1946
Patent expires October 5, 1959

6 Claims. (Cl. 343—6)

This invention relates to navigation aiding radio systems and has for its object to provide methods and apparatus for assisting the blind landing of aircraft and whereby an aircraft may be guided into land although fitted with only an ordinary medium wave receiver and a small indicator unit.

According to this invention a navigation aiding radio system for assisting the bl'nd landing of aircraft comprises a plurality of very short wave radio transmitter and receiver units disposed beneath and along the desired landing line, the transmitters being adapted to produce approximately constant fie d intens:ty along said landing line, a further radio transmitter and receiver unit arranged beyond the landing end of the desired landing line the further transmitter being arranged to transmit along said line, means for transmitting from a control po'nt, short pulses which key the first mentioned transmitters, means for receiving back at the control point portions reflected directly back from said transmitters, and also pulses derived by reflection from an aircraft and received upon the associated receivers in the desired landing line, means for similarly keying the additional transmitter and similarly receiving at the control point, short impulses reflected directly by said additional transmitter and also impulses derived from reflection from an aircraft and received upon the receiver associated with said further transmitter, and means operating in dependence upon the time interval between an impulse directly reflected from the input of a transmitter under the landing l'ne and a portion of the same impulse which has passed through the transmitter, has reached an aircraft descending the landing line, has been reflected toward the ground and has been received on the associated receiver and also in dependence upon the time interval between the impulses directly reflected from the additional transmitter and an impulse which has been reflected from the aircraft and thereafter obtained from the associated receiver for informing an aircraft of its altitude and its distance from a reference point near the intended touchdown point on the landing field.

Figure 1 represents, as seen from above, a landing field, and a glide-path into the field, as well as apparatus including components positioned on the ground below the glide-path;

Figure 2 represents a profile view of the glide-path to further illustrate the positions of said components as well as their respective operating zones along the path;

Figure 3 illustrates the modulation component of signals which are transmitted to an aircraft for informing the pilot of his position with respect to the glide-path;

Figure 5 represents a plot of the voltage changes appearing across condenser C3 of Figure 4 over a predetermined time interval;

Figure 6:
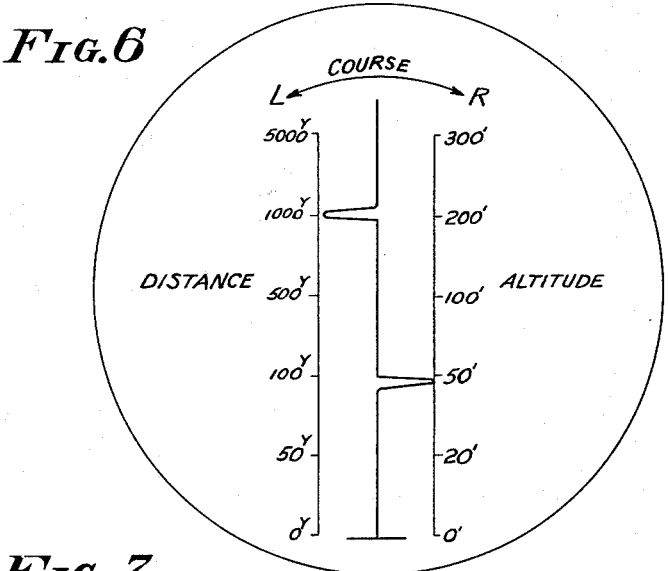
Figure 7:
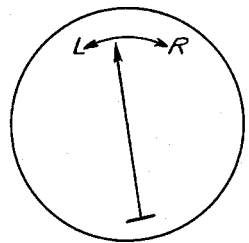

Figure 6 i lustrates the type of visual indication which is produced on board an aircraft by a radio system according to the present invention; and Figure 7 represents a conventional type of left-right deviation indicator to afford a standard of comparison for showing the appropriateness of the type of indication illustrated in Figure 6.

In Figures 1 and 2 there are shown a des:red landing line (glide-path) L, and, positioned on the ground at predetermined points below it, a series of cooperating transmitters and receivers A whose antennas may be in parabolic reflectors or may be so-called "horn radiators." These cooperating transmitters and receivers which need not be described as they are known and, in themselves, constitute no part of the invention, are arranged in a straight line along the ground projection of the landing line, L, and may operate, for example, at 600 megacyc.es per second. The spacings between the antennas and their respective apertures are so chosen as to give a fairly un.form field strength along the desired landing line L. These transmitters are connected to a central control system CCS by feeders F1—F8 which are all of equal length and these feeders carry from the control center D. C. pulses of, for example, 0.1 microsecond duration which key the transmitters in any suitable manner, for example, by using a circuit simi.ar to that shown in Fig. 141, page 169, of the War Department Technical Manual TM 11—467 in an arrangement wherein the D. C. keying pulses are applied to the left-hand terminal shown in that figure adjacent to the legend "trigger pulse from timer." A small portion of the keying pulses sent to a transmitter will be reflected from its input, e. g., due to a mismatch, and returned along the feeder to the control center. These pulses may be referred to as the "altitude direct reflection pulses," since they are reflected d.rectly from a transmitter as distinguished from others which pass through the transmitter into space, are reflected from an aircraft as radio waves, and pass through the cooperating receiver back into the feeder system. If an aircraft is above any of these transmitters, (one is so represented in Figure 2) the radio frequency pulses sent up to it will be reflected thereby and after reception and rectification by the appropriate receiver (as represented, the second) will also be returned to the control center via the feeder. These second pulses may be referred to as the "altitude radio reflection pulses," since they are reflected as radio waves. It will be clear that the time interval between altitude direct reflection pulses and the altitude radio reflection pulses will be a fair measure of the altitude of the aircraft. An additional transmitter and receiver unit B is located at the end of the aircraft runway, i. e. at the end of the landing line L, and is similarly keyed over a feeder connection F9 to the control center system CCS. In this case there will be produced what may be termed "distance direct reflection pulses" and "distance radio reflection pulses" (the terms "direct" and "radio" designating respectively the pulses which are reflected directly back from the input of the transmitter of unit B and those which are reflected through space from an aircraft and thereafter pass over the feeder F9 to the central control system CCS). Since the glide angle is very small, the time interval between these pulses will be a fair measure of the horizontal distance of the aircraft from the transmitter-receiver unit at the end of the runway. In practice it will be necessary to measure as short a time interval as one of the order of 1 microsecond to determine an altitude or distance of as little as 500 feet as the case may be. Obviously this requires very short pulses.

However, the information thus obtained must, of course, be transmitted to the aircraft which is assumed to be fitted with an ordinary medium wave receiver with which, as is well known, it is not possible to receive very short pulses. In order to make the information available to the aircraft, the time intervals must be multipled by a large constant factor, so that, for example, the altitude of 500 feet is represented not by an interval of one microsecond but by an interval of, say, 50 milliseconds, i. e. 1 millisecond per 10 feet and so that it will be permissible to use relatively wide pulses.

Similarly a suitable scale as regards distance would be 1 millisecond per 1,000 feet.

The required multiplication of the time intervals may be effected in any convenient way. For example a double beam cathode ray tube, which is represented in Fig. 1 as a portion of a pulse interval timer PIT, may be employed, one beam being caused to scan at a frequency and speed suitable for establishing an appropriate time-scale base line for measuring the actual time intervals involved between direct-reflection and radio-reflection pulses, and the other beam being caused to scan in a parallel direction and adjacent the first but with a velocity of, say, 1/50,000 of that of the first. To this end block PIT may include appropriate sweep circuits which will not be described in detail as they may be of any suitable conventional type. Two artificially generated pulses may be applied from a pulse generator PG to the slow moving cathode ray beam to produce visible pips and the generator may be controlled by hand so that the first pip coincides with the position on the screen of a pip on said time-measuring base line produced by the (say altitude) direct reflection pulse and so that the second pip coincides with the position of a pip on said time-measuring base line produced by the (say altitude) radio reflection pulse, the artificially generated pulses thus having the same separation on the screen as the altitude direct-reflection and radio-reflection pulses which are applied to modulate the quickly moving beam. These artificially generated pulses are at the same time used to modulate a medium wave transmitter T, in a manner later to be described herein. The manner in which modulation is applied to the medium wave transmitter need not be described, as it may take any one of a number of suitable forms, as will be well understood by the informed reader.

In the case of altitude measurement it will be difficult with present day technique to measure an altitude of less than 75 feet by radio methods, and accordingly it is preferred at that point in the landing line where the altitude becomes less than about 75 feet to replace the radio transmitters and receivers A, employed for altitude measurement as hereinbefore described, by means of corresponding "ultra-sonic" transmitters and receivers, the ultra-sonic transmitters being keyed by short pulses in the same manner as the radio transmitters. With ultra-sonic transmitters an altitude of 10 feet is of course represented by 20 milliseconds and this must be taken into account when obtaining information upon the basis of the interval between altitude direct reflection pulses sent out by an ultra-sonic transmitter and altitude non-direct reflection pulses received at the cooperating ultra-sonic receiver. To allow for different landing paths an overlap of the two systems (radio and ultra-sonic) with automatic selection of the appropriate pulses would be used.

To convey the information obtained to the pilot of the landing aircraft a standard type of "switched cardioid approach beam" may be used, the beam transmitter being also arranged so that it can operate as an omnidirectional transmitter (by operation of suitable switches) when required. A switched cardioid approach beacon is of course one in which similar but opposite intersecting cardioids are alternately obtained.

The beacon carrier is set at about 50% of peak voltage and is modulated as follows:

First period: Left cardioid—1/20 second. A tone appropriate to 2,000 cycles per second tone frequency terminated at a time corresponding to the altitude direct reflection pulse.

Second period: Omnidirectional transmission— 1/20 second. Pure carrier wave 50%, modulated to 100% at the appropriate time by a pulse corresponding to the altitude radio reflection pulse.

Third period: Right cardioid—1/20 second. A tone appropriate to 1500 cycles per second tone frequency terminated at a time corresponding to the distance direct reflection pulse.

Fourth period: Omnidirectional transmission— 1/20 second. Pure carrier wave 50% modulated to zero at the appropriate time by the pulse corresponding to the distance radio reflection pulse.

The sequence of signals received on the aircraft will, as illustrated in Figure 3, consist after detection of (a) 1/20 second, 2,000 cycle tone frequency, (b) 1/20 second carrier reception containing a single positive pulse whose distance from the beginning of this period is a measure of altitude, (c) 1/20 second, 1500 cycle tone frequency, (d) 1/20 second carrier reception containing a single negative pulse whose distance from the beginning of this period is a measure of the distance of the craft from the unit B.

Figure 4:
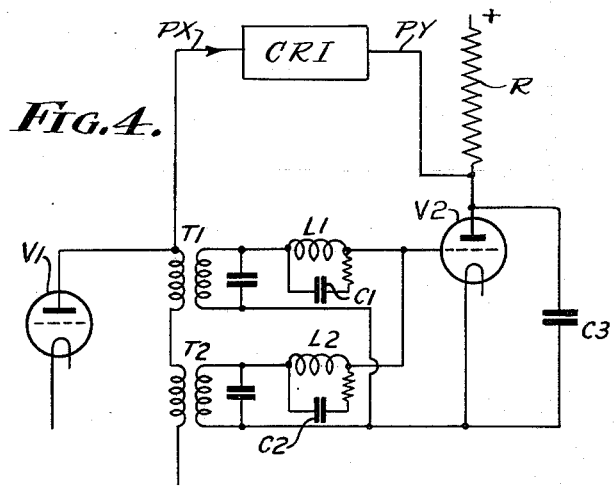
Figure 4 is a schematic diagram of a portion of an aircraft receiver according to the present invention.

The detector (represented in Figure 4 by valve

V1) of the aircraft receiver has in its output circuit the primaries of two transformers T1 and T2 in series, these transformers being respectively tuned to 2,000 cycles per second and 1500 cycles per second (the two tone frequencies). The detector plate also supplies output over connection PX, to one of two coordinate deflection systems of a small cathode ray indicator tube which is included in the cathode ray indicator CRI, shown in Fig. 4. The secondary of one transformer T1 is connected, through an inductance coil L1 shunted by a suitable capacity C1 the latter being in series with a resistance, to the grid of a valve V2 the other end of said secondary being connected to the cathode of valve V2. The secondary of the other transformer T2 is similarly connected between grid and cathode of valve V2, the grid connection including an inductance coil L2 in parallel with a condenser C2 the latter being in series with a small resistance. The plate of valve V2 applies deflection voltage over lead PY to the other coordinate deflection system of the cathode ray tube, and it will be seen that voltage across a condenser C3 which is connected between anode and cathode of the last mentioned valve and which is in series with resistance R, will consist, as represented in Figure 5, of a constant voltage period of ½₀ of a second which will occur while the 2,000 cycle tone is being detected, a rising voltage of ½₀ of a second with a sharp drop at the end of it, another constant voltage period occurring while the 1,500 cycle tone is being detected, another rising voltage period with a sharp drop at the end of it, and so on. This potential wave acts on said last-mentioned deflection system of the cathode ray tube to produce in one coordinate direction (such as upward in Fig. 6) a luminous exponential time base of 50 milliseconds duration.

The two inductance coils L1 and L2 are wound coaxially and differentially about the axis of the cathode ray tube and coaxial therewith to act as a third (and in this case magnetic) deflection system.

It will be seen that with this arrangement, when the plane is "on course" the amplitudes of the two tuned frequencies are equal and there will be no resultant axial magnetic field. If, however, right or left cardioids predominate, i. e. if the plane is "off course" there will be a resultant field due to the differential effect of the two coils, and, as a result, the luminous base line on the screen of the cathode ray tube, which is normally vertical will be tilted to one side or the other in a manner corresponding to the needle movements of a conventional left-right deviation indicator (see Figure 7) according to the direction of the "off course" bearing. The line of the time base, as indicated in Figure 6, will be broken by two peaks, one on each side. One of these peaks gives the horizontal distance from unit B to the aircraft and the other gives its altitude. A convenient arrangement for the cathode ray indicator CRI, is one in which two calibrated scales are provided for the screen of its cathode ray tube which are parallel to one another and to the base line in its normal or untilted position, one of the scales being marked in appropriate units of horizontal distance (such as yards) and the other being marked in appropriate units of altitude (such as feet). These scales are on each side of the normal time base deflection trace and at the top of this normal trace is provided a transverse deviation reference marked "course" "left" "right" or "L" "R." Thus all a pilot has to do is to watch the screen of the cathode ray tube upon which departures from course will be indicated by the tilt of the time base line, and distance and altitude will be indicated by the positions of the transverse peaks extending on opposite sides from said line.

If the cathode ray tube is of the type of an after-glow screen, a repetition frequency of ⅕th of a second will be sufficient to give a steady pattern and an indication of distance and altitude will be given for about every 40 or 50 feet of travel, which with a normal guiding angle is equivalent to giving a new indication for about every 3 feet of descent.

Where a large number of aircraft may be in the neighborhood of such a landing system, it is advisable to have some means of checking the correctness of the information obtained and transmitted.

This may be effected by mounting two dipoles on the aircraft, one horizontal and suitable for reflecting strongly the "altitude radio reflection pulse" and one vertical for reflecting the "distance radio reflection pulse." Each dipole may be broken at the center by a switch controlled by the pilot thus to indicate, by the change in amplitude of the retransmitted pulse that this is the one appropriate to the aircraft in question.

Where an operator is in charge of the control center of the system, he will be able to note by observation of the altitude pulse system which transmitter-receiver unit is given reflections, and thus obtain a check on the distance indicator system.

I claim as my invention:

1. A blind landing system for aircraft, including a plurality of stations spaced along a line which is the vertical projection on the ground of the desired glide path, a radio transmitter and receiver unit at each of said stations, a control point on the ground, and a plurality of feeder transmission lines, each extending from said control point to one of said stations where it is connected to the respective transmitter and receiver; a source of control pulses at said control point, connected to all of said transmission lines to key said transmitters, and pulse interval timer means at said control point, connected to all of said lines and responsive to pulses reflected along said lines from said transmitters and to pulses sent along said lines from said receivers to indicate the altitude of an aircraft with respect to said line.

2. A blind landing system for aircraft, including a plurality of stations spaced along a line which is the vertical projection on the ground of the desired glide path, a radio transmitter and receiver unit at each of said stations, a control point on the ground, and a plurality of feeder transmission lines, each extending from said control point to one of said stations where it is connected to the respective transmitter and receiver; a source of control pulses at said control point, connected to all of said transmission lines to key said transmitters, and pulse interval timer means at said control point, connected to all of said lines and responsive to pulses reflected along said lines from said transmitters and to pulses sent along said lines from said receivers to provide an output corresponding to the altitude of an aircraft with respect to said line; and a further transmitter and receiver unit adjacent the end of said glide path and connected to said control pulse source and to said pulse interval timer for actuating the interval timer with control pulses reflected from the transmitter of said further unit as well as with pulses received, as re-radiations through space, by the receiver thereof to cause the timer to provide a further output therefrom representing the position of said craft longitudinally of said glide path.

3. A blind landing system for aircraft, including a plurality of stations spaced along a line which is the vertical projection on the ground of the desired glide path, a radio transmitter and receiver unit at each of said stations, a control point on the ground, and a plurality of feeder transmission lines, each extending from said control point to one of said stations where it is connected to the respective transmitter and receiver; a source of control pulses at said control point, connected to all of said transmission lines to key said transmitters, pulse interval timer means at said control point, connected to all of said lines and responsive to pulses reflected along said lines from said transmitters and to pulses sent along said lines from said receivers to provide an output representing the altitude of an aircraft with respect to said line, a radio beacon transmitter of the type providing alternately overlapping radiation lobes intersecting on said glide path, means for modulating said beacon transmitter alternately with characteristic tones in accordance with the switching of said radiation lobes, and means for modulating said beacon transmitter during predetermined intervals with the output of said pulse interval timer means.

4. In a blind landing system for aircraft, including means on the ground for measuring the altitude of a craft and the position of said craft longitudinally of a desired glide path, a radio beacon transmitting a periodic sequence of signals including directional signals which establish an equisignal zone azimuthally coincident with said glide path, means responsive to said altitude and position measuring means to produce pulses respectively timed with respect to a timing reference signal in accordance with said altitude and said longitudinal position, and means for modulating said beacon signals with said pulses.

5. In a radio beacon system for aircraft including a directional transmitter on the ground for radiating alternately in overlapping lobes which intersect to define in azimuth a desired glide path, and means for modulating said transmitter to provide signals distinguishable from each other in said two lobes; means on the ground for measuring the altitude of an aircraft and the position thereof longitudinally of said glide path, said means providing said information in the form of spaced pairs of pulses, means for further modulating said transmitter with said pulses, airborne radio receiver means including means for distinguishing said distinguishable signals and translating them into separate output signals having unequal magnitudes when the aircraft carrying the receiver deviates laterally from said path, and an indicator system connected to said receiver, said indicator system including a cathode ray tube provided with a luminescent screen, two orthogonally related cathode ray beam deflection means, and a third ray deflection means, means connected to one of said two beam deflection means to provide a repetitive linear sweep of said beam in synchronism with the repetition of the pairs of pulses to produce a substantially linear trace on said screen, means for applying pulses from the output of said receiver to the other of said two deflection means to produce along said trace indications respectively representing said altitude and said longitudinal position, and means for applying said separate output signals in opposition to each other to said third deflection means to cause said trace to assume an angular position on said screen corresponding to the deviation of an aircraft laterally from said glide path.

6. A blind landing system for aircraft, including a plurality of stations spaced along a line which is the vertical projection on the ground of the desired glide path, a radio transmitter and receiver unit at each of said stations, a control point on the ground, and a plurality of transmission lines, each extending from said control point to one of said stations where it is connected to the respective transmitter and receiver; a source of control pulses at said control point, connected to all of said transmission lines to key said transmitters, and pulse interval timer means at said control point, connected to all of said lines and responsive to pulses reflected along said lines from said transmitters and to pulses sent along said lines from said receivers to indicate the altitude of an aircraft with respect to said line; a radio beacon transmitter providing directional signals for determining the position of an aircraft laterally of said glide path, means adjustable in response to said timer means to produce a pair of pulses separated in time by an amount proportional to said altitude, and means for utilizing said last-mentioned pulses to modulate said radio beacon transmitter.

SHIRLEY WALDRON HUGH
WOLSELEY FALLOON.

REFERENCES CITED

The following references are of record in the file of this patent:

UNITED STATES PATENTS

| Number | Name | Date |
|---|---|---|
| 2,165,256 | Hansell | July 11, 1939 |
| 2,221,939 | Bennett | Nov. 19, 1940 |
| 2,225,046 | Hunter | Dec. 17, 1940 |
| 2,255,569 | Peters | Sept. 9, 1941 |